United States Patent
Brombach

(10) Patent No.: US 10,868,427 B2
(45) Date of Patent: Dec. 15, 2020

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/482,181

(22) PCT Filed: Feb. 2, 2018

(86) PCT No.: PCT/EP2018/052617
§ 371 (c)(1),
(2) Date: Jul. 30, 2019

(87) PCT Pub. No.: WO2018/141892
PCT Pub. Date: Aug. 9, 2018

(65) Prior Publication Data
US 2020/0044455 A1  Feb. 6, 2020

(30) Foreign Application Priority Data
Feb. 2, 2017  (DE) .......................... 10 2017 102 018

(51) Int. Cl.
*H02J 3/38* (2006.01)
*H02J 3/16* (2006.01)

(52) U.S. Cl.
CPC ................ *H02J 3/386* (2013.01); *H02J 3/16* (2013.01)

(58) Field of Classification Search
CPC ................................... H02J 3/386; H02J 3/16
See application file for complete search history.

(56) References Cited

U.S. PATENT DOCUMENTS

| | | |
|---|---|---|
| 6,965,174 B2 | 11/2005 | Wobben |
| 9,279,411 B2 | 3/2016 | Beekmann et al. |
| 9,518,559 B2 | 12/2016 | Hiromasa et al. |
| 9,581,139 B2 | 2/2017 | Fortmann et al. |
| 9,831,810 B2 | 11/2017 | Achilles et al. |
| 9,920,745 B2 | 3/2018 | Fortmann |

FOREIGN PATENT DOCUMENTS

| | | |
|---|---|---|
| DE | 102012213830 A1 | 2/2014 |
| EP | 2793343 A1 | 10/2014 |
| EP | 3002453 A1 | 4/2016 |
| EP | 3068007 A1 | 9/2016 |

(Continued)

OTHER PUBLICATIONS

Wikipedia, "Tiefpass", https://de.wikipedia.org/w/index.php?title=Tiefpass accessed on Oct. 18, 2017, 7 pages (13 pages with English translation).

*Primary Examiner* — Robert L Deberadinis
(74) *Attorney, Agent, or Firm* — Seed Intellectual Property Law Group LLP

(57) ABSTRACT

A method for supplying electric power to an electrical supply grid that has a grid rated voltage and is operated at a grid voltage, wherein the supplied electric power has a reactive power component that is prescribed by a phase angle describing an angle between a current and a voltage of the supplied electric power, wherein the phase angle is set by means of phase angle control that has a delay function characterized by at least one time constant.

15 Claims, 3 Drawing Sheets

(56) References Cited

FOREIGN PATENT DOCUMENTS

| | | |
|---|---|---|
| JP | S63-228925 A | 9/1988 |
| JP | 2000060003 A | 2/2000 |
| JP | 2010045969 A | 2/2010 |
| JP | 2015-201900 A | 11/2015 |
| RU | 2516381 C2 | 5/2014 |
| WO | 2013/160486 A2 | 10/2013 |

METHOD FOR FEEDING ELECTRICAL POWER INTO AN ELECTRICAL SUPPLY NETWORK

BACKGROUND

Technical Field

The present invention relates to method for supplying electric power to an electrical supply grid. Furthermore, the present invention relates to a generator of electrical energy, in particular a wind power installation, and a wind farm, each of which are configured for performing such a method.

Description of the Related Art

Usually, generators of electrical energy are operated with the electrical loads of the electrical supply grid in parallel mode.

During this operation, the electrical real power provided by the generator can vary. The result of this is that the grid voltage ($V_{GRID}$), for example at the grid connection point of the generator, can also fluctuate.

In the interests of safe operation, such fluctuations are permissible only within very narrow limits, however.

BRIEF SUMMARY

Provided is a method of allowing voltage changes to be controlled better even when the supply of real power fluctuates.

Provided is a method for supplying electric power to an electrical supply grid. The electrical supply grid in this case has a grid rated voltage and is operated at a grid voltage. Moreover, the supplied electric power has a real power component and a reactive power component.

The supply of the electric power is controlled by the phase angle, wherein the phase angle describes the angle between the supplied current and the voltage of the supplied electric power.

The phase angle is set by means of phase angle control that has a delay function characterized by at least one time constant.

Phase angle control is therefore proposed in order to control the reactive power component of the supplied electric power, wherein the phase angle control has a delay function for this purpose.

The delay function, which can also be referred to as delay for short, has at least one time constant for this purpose.

The phase angle control therefore does not react immediately to changes in the electrical supply grid, but rather lags them with a time delay.

The use of the time constant in particular damps the system response of the generator in relation to the electrical supply grid. If there is now an oscillation in the electrical supply grid, for example, the generator has a damping effect on this oscillation and does not amplify it.

The method therefore reacts particularly gently to grid perturbations or fluctuations in the electrical supply grid.

A particular advantage in this case is that in particular the at least one time constant minimizes what is known as overshooting by the generators, which can occur as reaction to grid perturbations.

The method is therefore particularly intended to support the electrical supply grid as follows: if the grid voltage initially changes in transient fashion, the supply of current remains the same at the first moment, that is to say as before the transient change of grid voltage. When the load is connected during simultaneously under-excited operation of the wind power installation or of the wind farm, which therefore supplies in inductive fashion, the phase on connection terminals of the wind power installation or the wind farm jumps to the current phasor of the supplied current. As a result of load connection in the electrical supply grid, the supply grid voltage normally drops locally and the frequency in the grid falls. The delayed phase angle control increases the supply of real power, however, so as to support the frequency of the electrical supply grid, and at the same time the reduced under-excited operation of the wind power installation or of the wind farm supports the voltage, because the voltage-lowering under-excited reactive current supplied is reduced. If the phase jumps away from the current phasor, for example as a result of load disconnection in the electrical supply grid, the supply grid voltage rises. The proposed delayed phase angle control lessens the supply of real power, however, so as to support the frequency of the electrical supply grid, and increases the inductive reactive current, in order to scale down the voltage rise.

Preferably, the phase angle control alters the phase angle on the basis of at least one grid voltage recorded in the electrical supply grid, in particular such that the grid voltage is regulated to a prescribed voltage setpoint value.

The phase angle is therefore set on the basis of the recorded grid voltage. To this end, the grid voltage can be recorded at the grid connection point of the generator, for example.

It is advantageous that the grid voltage, in particular at different locations in the electrical supply grid, can be recorded in a simple manner and the method can therefore be implemented without great effort in all the existing generators, in particular a wind power installation.

Preferably, the phase angle is set in this case such that it regulates the grid voltage to a prescribed voltage setpoint value. For this purpose, the prescribed voltage setpoint value is freely parameterizable and is particularly preferably set to a value in a range between 105% and 110% of the grid rated voltage. The generator using the method is therefore configured to regulate the grid voltage at its grid connection point to a value above the grid rated voltage.

It is particularly advantageous in this case that the generator, in particular the wind farm, itself compensates for the voltage increase at the grid connection point caused by supply by means of its supply of reactive power.

Preferably, the phase angle is altered such that the grid voltage at at least one prescribed point in the electrical supply grid remains substantially unaltered.

The phase angle is therefore alterable, i.e., it varies over time. Moreover, the phase angle is in this case set such that the grid voltage at a point in the electrical supply grid remains substantially constant. Preferably, this point is the grid connection point of the generator carrying out the method. By way of example, the generator is a wind farm and the prescribed point is the grid connection point of the wind farm. The phase angle is then varied on the basis of the recorded grid voltage such that the grid voltage at the grid connection point is substantially unaltered, for example 1.05 p.u. of the grid rated voltage at the grid connection point. The generator therefore supplies an electric power, comprising a reactive power component and a real power component, at the grid connection point such that the grid voltage at the grid connection remains constant and substantially corresponds to a prescribed voltage setpoint value, for example 1.05 p.u. of the grid rated voltage. If the electrical supply grid thus has a grid rated voltage of 10 kV at the grid connection point of the generator, the generator supplies the electric power such that a grid voltage of 10.5 kV is obtained at the grid connection point.

The method therefore allows a generator of electrical energy, for example a wind farm, to be controlled such that the wind farm supports or keeps stable the grid voltage in the electrical supply grid at an arbitrary, prescribable point in the electrical supply grid.

In a particularly preferred embodiment, the prescribed point is the grid connection point and the grid voltage is likewise recorded at the grid connection point of the generator.

Preferably, the phase angle is altered on the basis of a setpoint voltage and the setpoint voltage is prescribed in a range from 105% to 110% of the grid rated voltage.

The phase angle is therefore altered on the basis of a setpoint voltage, wherein the setpoint voltage, that is to say a voltage setpoint value, is higher than the grid rated voltage.

This is because it has been identified that such a choice of setpoint voltage, above the grid rated voltage, likewise relieves the load on the electrical supply grid, in the same way as tracking the phase angle, that is to say the delay function. This results in particular in synergistic effects in relation to the oscillation behavior of the electrical supply grid. In particular, this allows grid oscillations arising in the supply grid to the damped more heavily than usual hitherto, in particular such that the risk of a system split or of a blackout is minimized further. Such a property is desirable in particular in relation to weak electrical supply grids, such as in Brazil, for example. It is thus particularly also possible for sub-synchronous oscillation resonances, also referred to as SSR oscillations, to be damped. SSR oscillations are oscillations at a frequency lower than the grid frequency, for example 30 Hz for a grid frequency of 50 Hz. As a result of the proposed delayed tracking, a control oscillation of this kind with the series resonance is not readily possible because the delay in the phase angle control prevents this.

Preferably, the at least one time constant is varied to alter the delay function.

The time constant is therefore alterable. In particular, the time constant can be altered in the course of operation and therefore matched to the prevailing grid conditions or to the prevailing grid state. By way of example, the time constant is set lower during a very stable grid state than for a less stable grid state. The time constant therefore preferably matches the grid state or the prevailing grid state.

Preferably, the delay function or the at least one time constant is alterable by means of an adaptation algorithm to alter the delay, wherein the adaptation is performed in particular on the basis of a grid state.

The delay function or the at least one time constant is therefore adapted or set by means of an adaptation or an adaptation algorithm in the course of operation. The adaptation in this case is preferably performed on the basis of a grid state, for example on the basis of the recorded grid voltage. The time constant is set for example on the basis of the deviation in the recorded grid voltage from the grid rated voltage.

According to one embodiment, it is proposed that the delay function is set or varied, whether by an adaptation algorithm or otherwise, on the basis of the grid sensitivity. The grid sensitivity in this case can be described as the ratio of a voltage change at the grid connection point to a change in the supply of real power at the grid connection point.

Preferably, the phase angle control has a proportional response characteristic, so that the phase angle control prescribes a phase angle in proportion to a voltage deviation, and the delay function has a $1^{st}$ order, $2^{nd}$ order or higher order transfer function, in particular a linear transfer function.

The phase angle control therefore has a proportional response. This can be achieved by means of the use of a P controller for example. In particular the voltage deviation, that is to say the deviation in the recorded grid voltage from the grid rated voltage or the deviation in the recorded grid voltage from a prescribed voltage setpoint value, is used for this.

As a result of the time constant and the proportional response of the phase angle control, the phase angle control reacts particularly gently to grid perturbations. To produce such phase angle control, PT1 or PT2 elements are preferably used, that is to say $1^{st}$ (first) or $2^{nd}$ (second) order delay functions, which in particular form a linear transfer function.

The reason is that it has been identified that the use of pure I elements can be disadvantageous in regard to grid stability.

Preferably, the at least one time constant is prescribed externally to alter the delay, in particular by an operator of the electrical supply grid.

The at least one alterable time constant can therefore be prescribed by the grid operator at any time. The grid operator can therefore set the response of the phase angle control itself by altering the time constant itself.

This is particularly advantageous in critical grid situations, for example in the event of grid restoration. In this case, it can be desirable, by way of example, for the phase angle control to have a particularly hard control characteristic. The network operator can then set the time constant according to this requirement.

Preferably, the phase angle control has a nonlinear response characteristic or the phase angle control has a response characteristic mappable by a higher order, preferably at least $3^{rd}$ order, polynomial function. This allows an amplitude dependency of the phase angle control to be achieved, so that a higher gain can be achieved for higher voltage deviations, for example.

A nonlinear response can be implemented in the phase angle control by a higher order polynomial function, for example.

Preferably, the phase angle control tracks the phase angle on the basis of a grid situation of the electrical supply grid, in particular tracks it on the basis of the grid sensitivity of the electrical supply grid.

It is therefore proposed that the phase angle control is carried out adaptively, in particular such that the electrical supply grid or a prevailing grid situation of the electrical supply grid is taken into consideration therefor.

By way of example, the electrical supply grid is of low performance design, i.e., there are only a few generators and loads. In such a case, the phase angle control would have a great influence on the response of the electrical supply grid. Precisely for such, in particular specific, grid situations, it is now proposed that the grid situation is accordingly taken into consideration when controlling the phase angle.

Particularly preferably, it is proposed that the phase angle is tracked on the basis of the grid sensitivity. The grid sensitivity is in this case more preferably specified as a change in the voltage of the electrical supply grid for a change in the supplied real power. Phase angle control therefore preferably has a nonlinear response characteristic.

A generator of electrical energy, in particular a wind power installation, is moreover proposed, comprising a generator unit for generating an electric power that has phase angle control configured to carry out a method as described above or below.

The generator of electrical energy is therefore preferably a wind power installation. The wind power installation or the generator comprises a generator unit for generating an electric power, for example a power inverter. The power inverter in turn has actuation that comprises phase angle control, wherein the phase angle control has a delay function.

This allows the wind power installation to participate in the grid control particularly gently. The wind power installation is particularly suitable therefor, because it forms a generator that can change its supplied power very quickly according to level and type. It can therefore control and react very quickly and therefore a delay is actively prescribable and settable because a wind power installation has no significant, physically dependent delay response of its own.

A wind farm is further proposed, comprising at least two wind power installations and a wind farm control unit, wherein the wind farm control unit has phase angle control configured to carry out a method as described above or below.

In a particularly preferred embodiment, the phase angle control comprising the delay function is implemented in a wind farm control unit.

As a result, multiple wind power installations are combined to form a generator of electrical energy, wherein the generator has the response. In particular, the delay function is implemented in the wind farm control unit. A wind farm can also fundamentally react as quickly as a wind power installation, and therefore the wind farm is also well suited to implementing the methods described above, as has already been explained for the wind power installation.

BRIEF DESCRIPTION OF THE SEVERAL VIEWS OF THE DRAWINGS

The present invention is now explained more specifically below in exemplary fashion on the basis of exemplary embodiments with reference to the accompanying figures.

DETAILED DESCRIPTION

Figure 1:
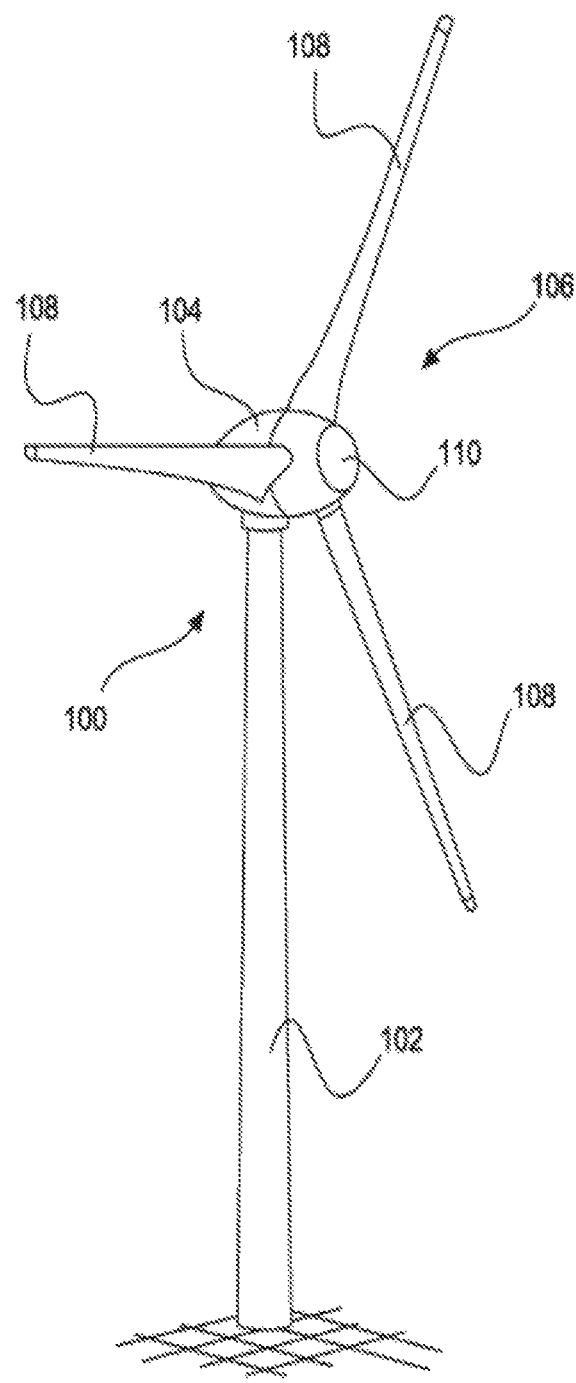
FIG. 1 schematically shows a perspective view of a wind power installation.

FIG. 1 shows a wind power installation 100 comprising a generator unit for generating an electric power that has phase angle control that is configured, by means of phase angle control that has a delay function characterized by at least one time constant, to carry out a method as described above or below.

The wind power installation has a tower 102 and a nacelle 104. The nacelle 104 has a rotor 106 arranged on it, having three rotor blades 108 and a spinner 110. The rotor 106 is set in a rotary motion by the wind during operation and thereby drives a generator in the nacelle 104.

Figure 2:
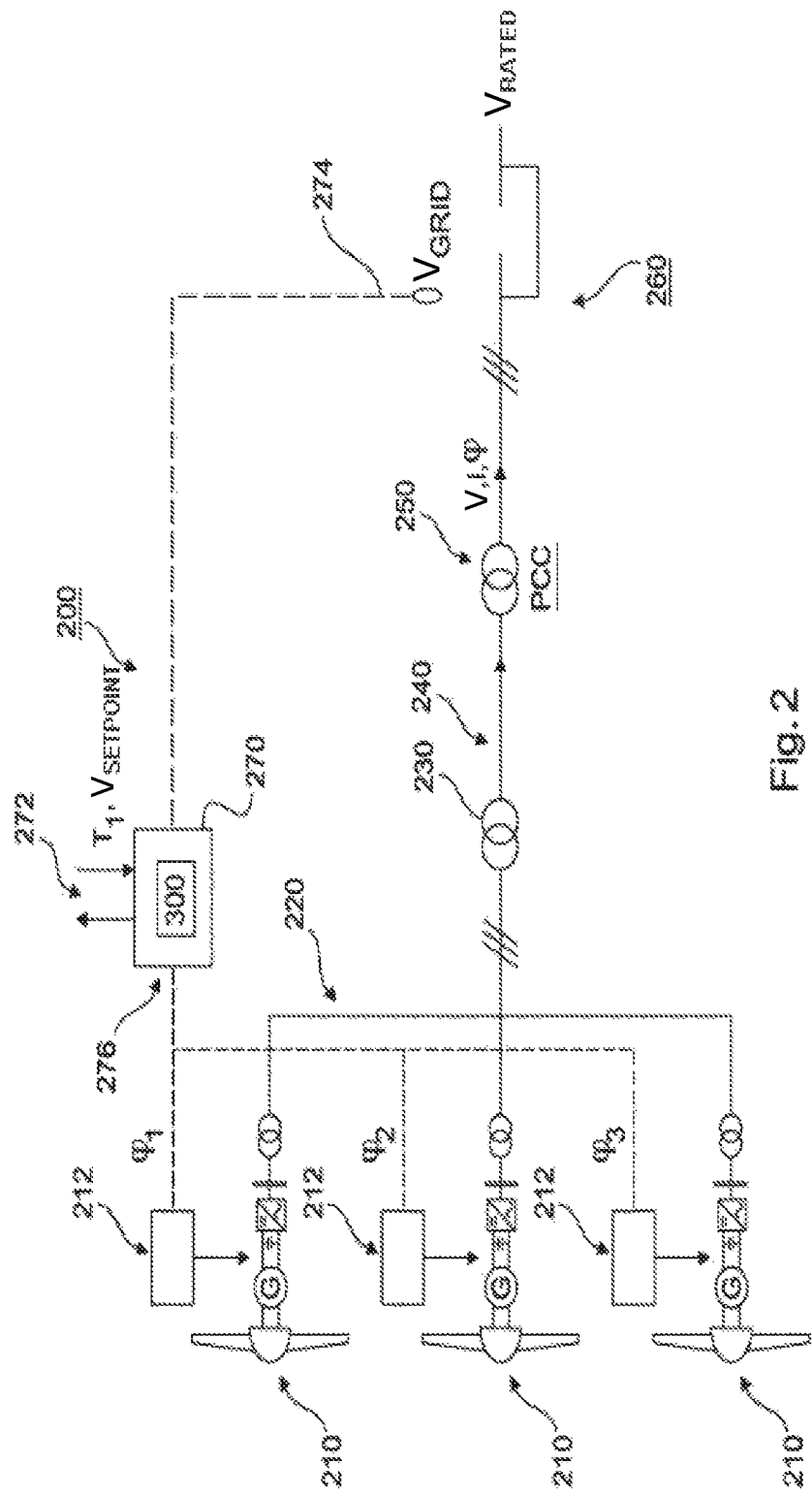
FIG. 2 schematically shows a design of a wind farm.

FIG. 2 shows a design of a wind farm 200. The wind farm 200 has, in exemplary fashion, three wind power installations 210 of the same design that are connected to one another via a wind farm grid 220. The wind power installations 210 comprise a wind power installation control unit 212 and each generate an electric power comprising a reactive power component, which is supplied to the electrical distribution grid 260 via the wind farm grid 220 by means of a wind farm transformer 230, a supply line 240 and a grid transformer 250 at a grid connection point PCC.

The wind farm 200 has a wind farm control unit 270. The wind farm control unit 270 has phase angle control 300 in order to set the phase angle φ describing the angle between the current I and the voltage V of the supplied electric power. To this end, the phase angle control 300 has a delay function characterized by at least one time constant T1.

The communication interface 272 can be used, for example by the network operator, to set the at least one time constant T1 externally. The communication interface 272 can also be used to prescribe the setpoint voltage, in particular in a range of 105% to 110% of the grid rated voltage $V_{RATED}$.

Further, the wind farm control unit 270 has a measuring device 274 for recording the grid voltage $V_{GRID}$ and a control interface 276 for controlling the wind power installations 210. In particular the control interface 276 can be used to transfer the phase angles φ1, φ2, φ3 calculated by the phase angle control 300 to the wind power installation 210.

Figure 3:
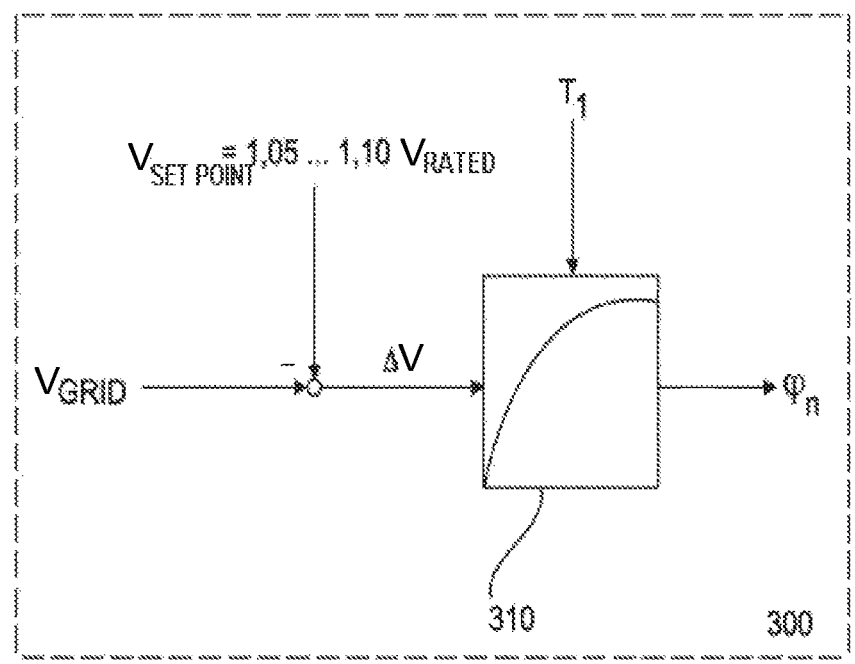
FIG. 3 schematically shows the design of phase angle control in a particularly preferred embodiment.

FIG. 3 schematically shows the design of phase angle control 300 in a particularly preferred embodiment.

The phase angle control 300 has a 1$^{st}$ (first) order delay function and therefore forms a 1$^{st}$ order transfer function. The delay function 310 has a time constant T1 that is prescribed externally. This can be done by the network operator, for example. The network operator in turn can use an adaptation algorithm to alter the delay or to set the time constant T1.

The input variables ΔV used to set the phase angle $φ_N$ are the recorded grid voltage $V_{GRID}$ and a setpoint voltage $V_{SETPOINT}$, wherein the setpoint voltage $V_{SETPOINT}$ is prescribed in a range from 105% to 110% of the grid rated voltage. It can likewise be prescribed by the network operator or by the generator itself.

The input variable ΔV is therefore a system deviation, namely the difference between recorded grid voltage $V_{GRID}$ and prescribed setpoint voltage $V_{SETPOINT}$.

The phase angle $φ_N$ is therefore determined from the system deviation ΔV, wherein the phase angle $φ_N$ is a delayed phase angle.

The phase angle $φ_N$ is then transferred to the applicable control units of the generators. The phase angle $φ_N$ is therefore altered such that the grid voltage at at least one prescribed point in the electrical supply grid remains substantially unaltered.

The invention claimed is:

1. A method comprising:
supplying electric power to an electrical supply grid that has a grid rated voltage and is operated at a grid voltage, wherein the supplied electric power has a reactive power component that is prescribed by a phase angle describing an angle between a current and a voltage of the supplied electric power, wherein the phase angle is set by phase angle control that has a delay function by at least one time constant.

2. The method of claim 1, wherein the phase angle control alters the phase angle based on at least one grid voltage recorded in the electrical supply grid.

3. The method of claim 2, wherein the at least one grid voltage is regulated to a particular voltage setpoint value.

4. The method of claim 1, wherein the phase angle is altered such that the grid voltage remains substantially unaltered at at least one prescribed point in the electrical supply grid.

5. The method of claim 1, wherein the phase angle is altered based on a setpoint voltage, and the setpoint voltage is prescribed in a range from 105% to 110% of the grid rated voltage.

6. The method of claim 1, wherein the at least one time constant is varied to alter the delay function based on at least one of: a grid state or a grid sensitivity.

7. The method of claim 1, wherein the delay function or the at least one time constant is altered by an adaptation algorithm to alter the delay, wherein the adaptation algorithm is performed based on at least one of: a grid state or a grid sensitivity.

8. The method of claim 1, wherein:
the phase angle control has a proportional response characteristic, so that the phase angle control prescribes a phase angle in proportion to a voltage deviation; and
the delay function has a first order transfer function and a second order transfer function.

9. The method of claim 8, wherein the first order transfer function and the second order transfer function are linear transfer functions.

10. The method of claim 1, wherein the at least one time constant is prescribed externally to alter the delay function.

11. The method of claim 1, wherein:
the phase angle control has a non-linear response characteristic; or
the phase angle control has a response characteristic mappable by a higher order, polynomial function.

12. The method of claim 1, wherein the phase angle control tracks the phase angle based on a grid situation of the electrical supply grid.

13. The method of claim 12, wherein the grid situation of the electrical supply grid is a grid sensitivity of the electrical supply grid.

14. An electric generator of a wind power installation, comprising:
a generator unit configured to generate an electric power that has phase angle control configured to carry out the method of claim 1.

15. A wind farm comprising:
at least two wind power installations; and
a wind farm control unit, wherein the wind farm control unit has phase angle control configured to carry out the method of claim 1.

* * * * *